United States Patent

Stevenson et al.

[11] 4,349,144
[45] Sep. 14, 1982

[54] FRICTION WELDING MACHINE WITH DUAL POSITION END STOP

[75] Inventors: Christopher T. S. Stevenson, New Britain; Elio F. D'Aloisio, East Hartford, both of Conn.

[73] Assignee: Litton Industrial Products, Inc., New Britain, Conn.

[21] Appl. No.: 231,669

[22] Filed: Feb. 5, 1981

[51] Int. Cl.³ .............................................. B23K 19/02
[52] U.S. Cl. ........................................ 228/2; 228/44.5; 269/303;320
[58] Field of Search ..................... 228/2, 44.1 R, 44.5, 228/112, 49 R, 49 B; 82/31; 269/303, 304, 315, 320, 71, 73

[56] References Cited

U.S. PATENT DOCUMENTS 3,599,857  8/1971  Loyd ........................................ 228/2
3,784,080  1/1974  Ditto ....................................... 228/2

Primary Examiner—Nicholas P. Godici
Assistant Examiner—M. Jordan

Attorney, Agent, or Firm—Spencer T. Smith

[57] ABSTRACT

A friction welding machine comprising a base including a horizontal way surface, and a plurality of horizontally spaced keyways, an end stop assembly including a housing having roller supports for permitting horizontal displacement of the end stop assembly along the way surface. The device further includes a slide member having keys for matingly engaging with the base keyways and a pair of vertically spaced, horizontally extending, axially spaced end stops. A first member is included for locating the slide member at a lowermost position for locating the upper end stop at a predetermined machining location, a second member is included for locating the slide member at an intermediate position for locating the lower end stop at a predetermined machining location, and a third member is included for locating the slide member at an upper portion whereat the slide keys becomes disengaged from the base keyways whereby the end stop assembly can be horizontally displaced relative to the base.

1 Claim, 3 Drawing Figures

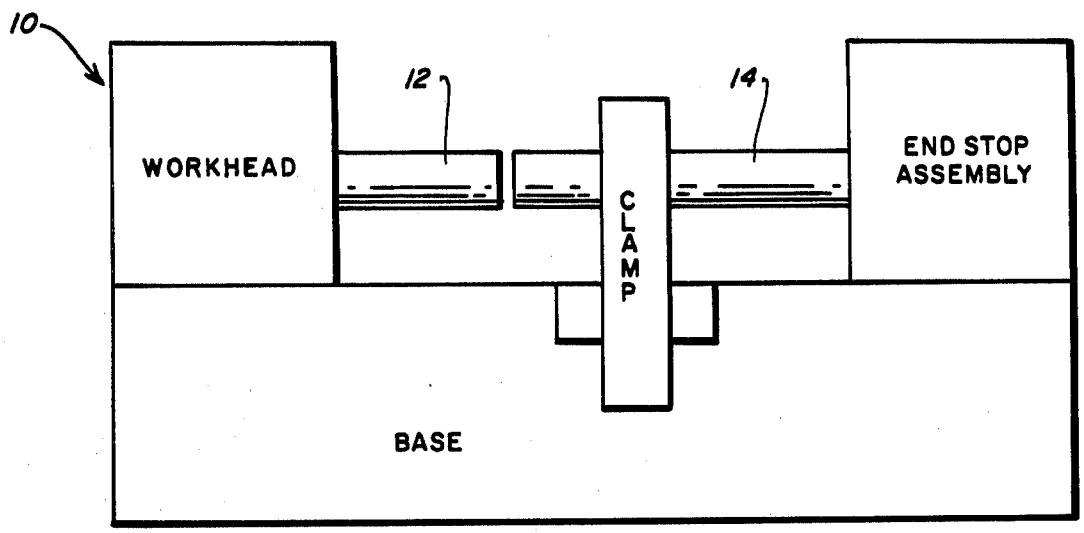
Fig_1
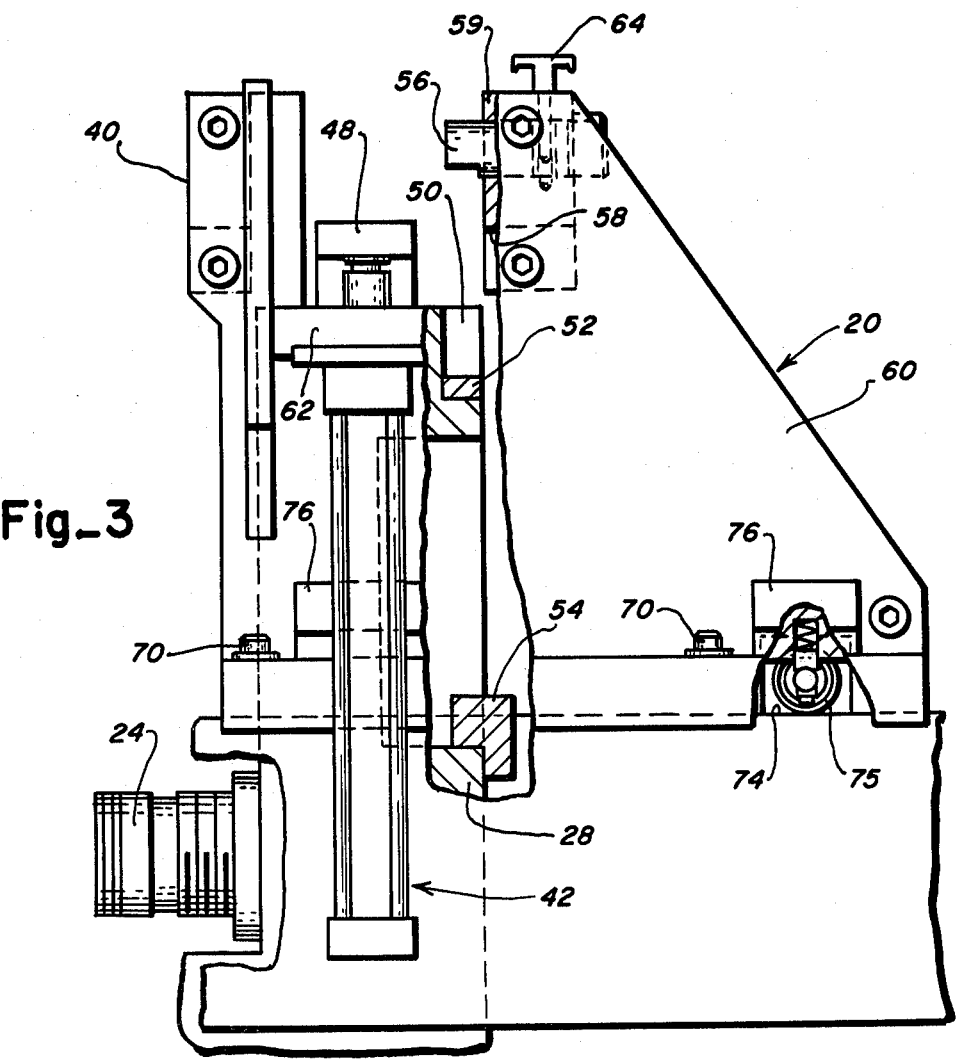
Fig_3

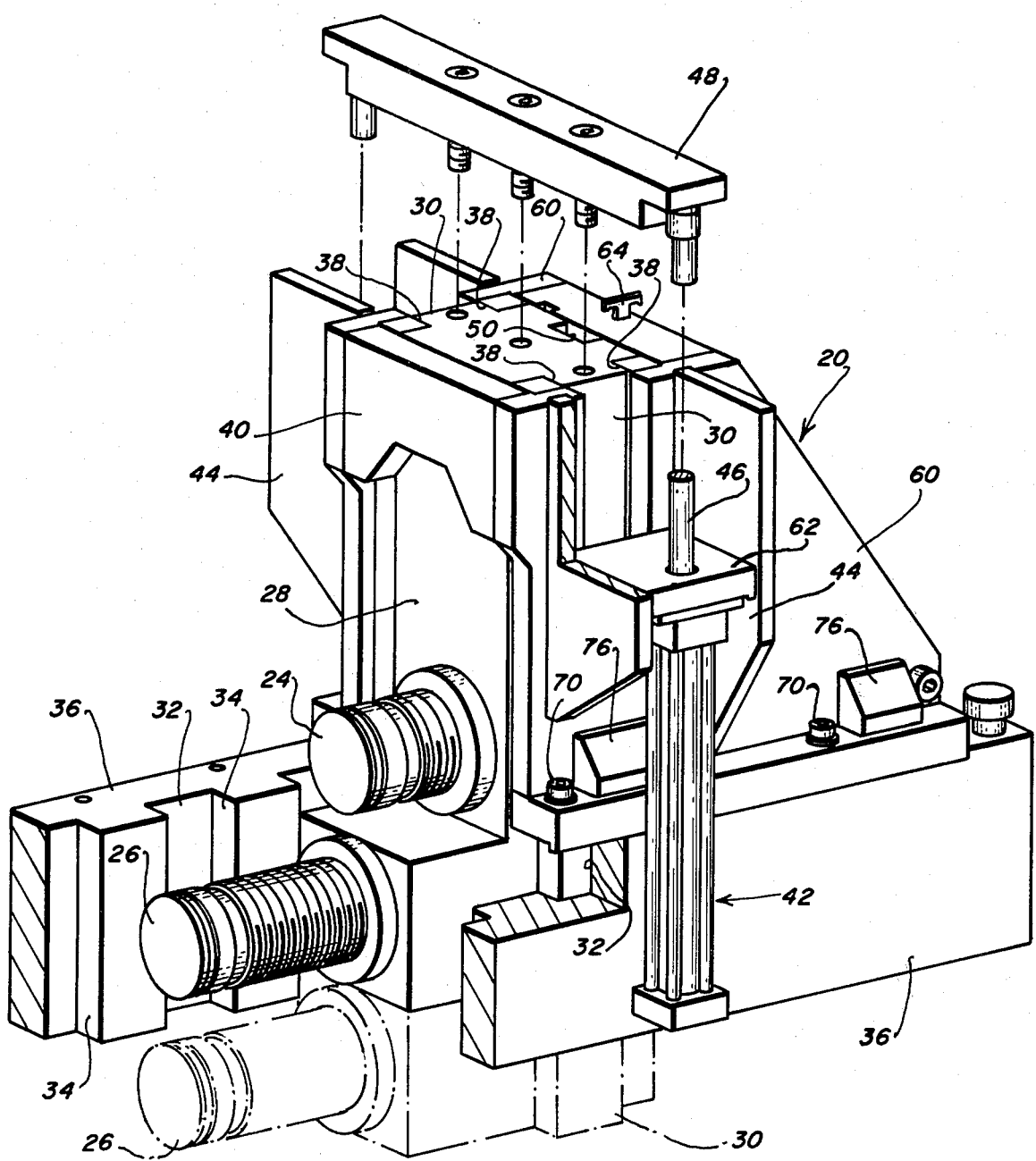
Fig_2

FRICTION WELDING MACHINE WITH DUAL POSITION END STOP

The present invention relates to friction welding machines for welding components to opposing ends of a workpiece.

The disclosed friction welding machine includes an improved end stop assembly which permits the sequential welding of components to opposing ends of a workpiece.

Other objects and advantages of the present invention will become apparent from the following portion of this specification and from the accompanying drawings which illustrates, in accordance with the mandate of the patent statutes, a presently preferred embodiment incorporating the principals of the invention.

FIG. 1 is a schematic diagram of a friction welding machine;

FIG. 2 is a perspective view of the end stop assembly illustrated in FIG. 1; and FIG. 3 is a side view partially in section of a portion of the end stop assembly illustrated in FIG. 2.

A friction welding machine 10 rapidly rotates or orbits a first workpiece 12 which is maintained in forceful engagement with a second axially related workpiece 14. The resulting friction heats the workpieces at the location of contact to a weldable mass. When displacement ceases, the resulting weld permanently joins the two workpieces. A friction welding machine includes a base for supporting a workhead which rotatably or orbitally drives and axially advances a first workpiece 12, a clamp or chuck for gripping a second axially related workpiece 14 and an end stop assembly to prevent the axial displacement of the clamped second workpiece 14 when it is forcefully engaged by the first workpiece 12.

The end stop assembly 20 includes an upper end stop 24 and a lower end stop 26. These stops are mounted on a vertical slide member 28 having opposing vertically extending keys 30 which are matingly received in opposing slots or keyways 32 having a first portion 34 defined in spaced horizontal beams 36 which are rigidly mounted to the machine base and having a second portion 38 defined in the end stop housing 40.

A hydraulic cylinder assembly 42 is fixedly secured to a pair of vertical support brackets 44 on either side of the housing. The cylinder rods 46 are secured to a tie bar 48, which is bolted to the top of the vertical slide member 28.

The vertical slide member has a vertical slot 50 defined in its rear face. Secured within this slot is an upper stop 52. Directly below the upper stop is a lower stop 54 which rearwardly projects from the slide member 28. The upper stop 52 cooperates with the extended pin 56 and the lower stop 54 cooperates with a bottom surface 58 of the pin housing 59 which is secured between a pair of rearwardly extending end stop mounting brackets 60.

The end stop assembly, accordingly, has three positions. The lowermost position where the tie bar 48 engages the cylinder mounting plates 62, an intermediate position where the upper stop 52 engages with the extended pin 56, and the uppermost position where the lower stop engages with the pin housing 58. To permit the raising of the slide member to the uppermost position, where the slide keys 30 vertically clear the tie beam keyways 34, a locking pin 64 must be pulled to permit full retraction of the control pin 56 to clear the upper stop 52.

When the vertical slide member is at its intermediate position, the lower end stop 26 is in machining position for preventing axial displacement of a clamped workpiece during a first welding operation. After the first weld has been completed, thereby lengthening the workpiece, the slide member is vertically indexed to its lowermost position thereby locating the upper end stop 24 in machining position and permitting an additional piece to be frictionally welded to the two-part workpiece.

To reposition the end stop assembly 22 along the beams 36, the slide 28 is raised to its uppermost position. Bolts 70 are then removed allowing the housing to be horizontally displaced along the way surfaces 74 of the beams on spring-loaded rollers 75 of four roller assemblies 76.

What is claimed is:
1. A friction welding machine comprising
   a base including horizontal way surface means, and a plurality of horizontally spaced keyway means,
   an end stop assembly including
      housing means having roller support means for permitting horizontal displacement of said end stop assembly along said way surface means, and
      slide means having key means for matingly engaging with said base keyway means and a pair of vertically spaced, horizontally extending, axially spaced end stops,
      first means for locating said slide means at a lowermost position for locating the upper end stop at a predetermined machining location,
      second means for locating said slide means at an intermediate position for locating the lower end stop at a predetermined machining location, and
      third means for locating said slide means at an uppermost position whereat said slide key means becomes disengaged from said base keyway means whereby said end stop assembly can be horizontally displaced relative to said base.

* * * * *